May 28, 1935.　　　H. A. ONKEN　　　2,002,922
COUPLING FOR PUMP RODS, TRAILER HITCHES, AND THE LIKE
Filed Feb. 9, 1935
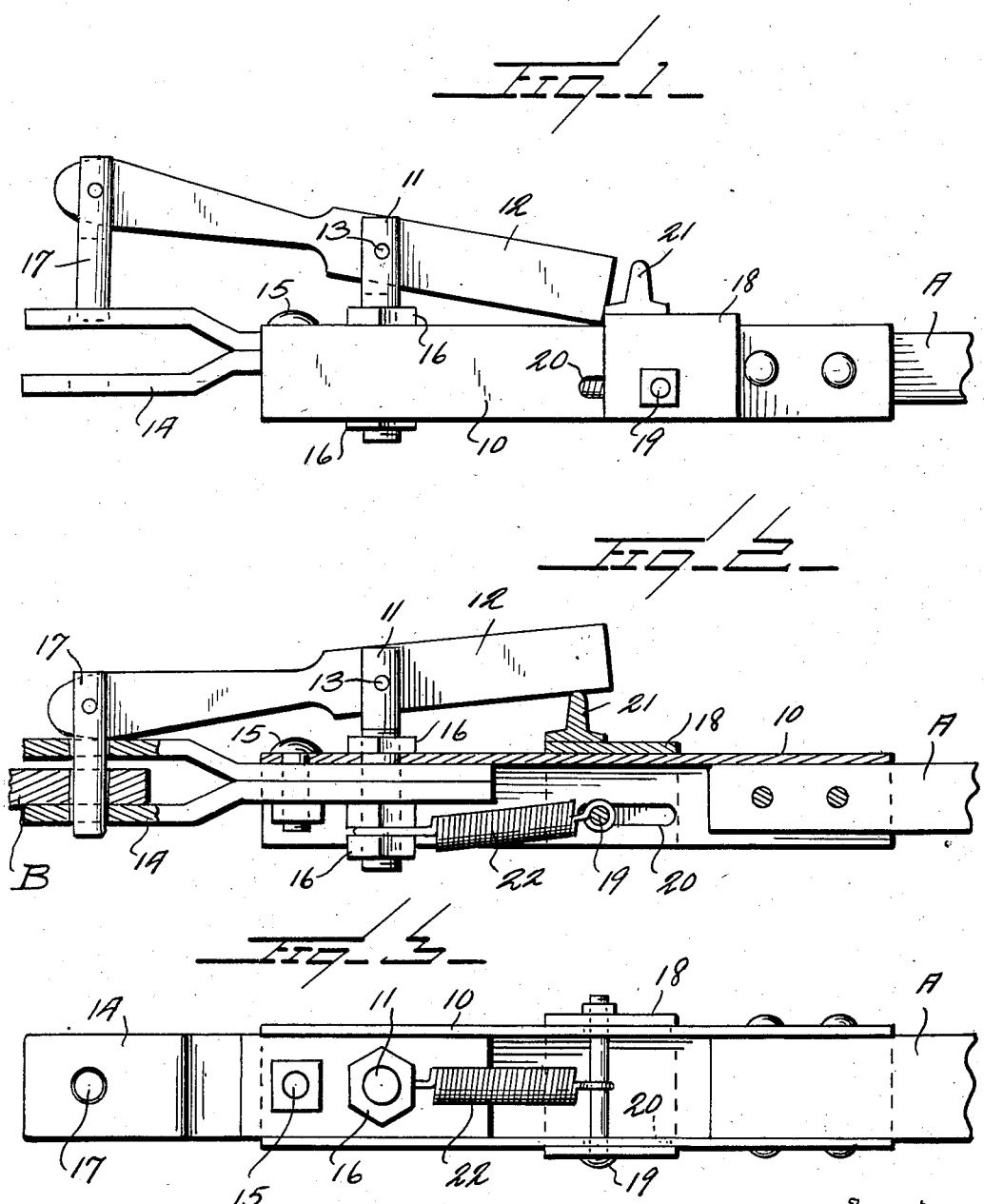
Inventor
H. A. Onken
By Watson E. Coleman
Attorney Patented May 28, 1935

2,002,922

UNITED STATES PATENT OFFICE 2,002,922

COUPLING FOR PUMP RODS, TRAILER HITCHES AND THE LIKE

Herman A. Onken, Webster City, Iowa

Application February 9, 1935, Serial No. 5,879

3 Claims. (Cl. 280—33.15)

This invention relates to couplings and the general object is to provide a coupling by which two elements may be readily coupled to each other or uncoupled from each other.

A further object is to provide a coupling device of this character in which the locking bolt is positively held in its locked position until manually released, and a further object is to provide a device of this character which is adapted for use as a trailer hitch, for coupling pump rods of windmill pumps to each other, and for many other purposes of a like character.

My invention is illustrated in the accompanying drawing, wherein:—

Figure 1 is a side elevation of my improved coupling.

Fig. 2 is a longitudinal sectional view thereof.

Fig. 3 is an underside plan view.

Referring to the drawing, 10 designates the body of the coupling which is formed of a length of channel iron. Extending upward through the body is a pin 11, upon which is mounted a lever 12, the pivot for the lever being designated 13. The pin 11 passes through the rear end of a fork, the two arms of which are designated 14. This fork may be formed of a folded strip of metal or of two strips of metal, as illustrated, the strips being divergently related at their forward ends so as to be spaced apart, the rear ends of the strips being brought close together and inserted within the channel iron 10 and held in place by the pin 11 which in this case constitutes a bolt, and by a rivet or bolt 15. The pin or bolt 11 is provided with the two nuts 16 whereby the pin 11 may be adjusted up or down. The forward end of the fork 14 is provided with alined openings through which a locking bolt 17 pivotally mounted upon the extremity of the lever 12 operates. When the rear end of the lever 12 is depressed, the locking bolt 17 will be drawn upward and out of its locking position. For the purpose of holding the forward end of the lever depressed and holding the pin depressed through the fork, I provide a shiftable element 18. This constitutes a base or yoke which embraces the channel iron 10 and is held thereto by a transverse bolt 19, this bolt at its opposite ends passing through slots 20 in the side flanges of the channel iron. Thus the element 18, which I will hereafter call a slide, may be shifted toward or from the fulcrum pin 11 upon which the lever 12 is fulcrumed. The slide 18 carries upon it the upwardly extending lug 21, and when the slide is pushed forward this lug 21 will extend under the rear end of the lever 12 and prevent the depression of the rear end of the lever and the elevation of the locking bolt 17 out from the fork 14. When the slide 18 is shifted rearward, it of course leaves the rear end of the lever free to be depressed.

The slide 18 is pulled forward or in the direction of the pin 11 by means of a coiled contractile spring 22 which is attached at one end to the bolt 19 and at the other end to any suitable attaching point, as for instance, the bolt or pin 11. It will thus be obvious that the slide 18 is urged toward the pin 11 by the spring 22 but that the slide may be manually retracted to free the lever 12 whenever desired, and that when it is so retracted and the rear end of the lever 12 drops, the slide as released will abut against the rear end of the lever 12 and by friction hold the lever 12 in a raised position.

In actual use, the body 10 will be attached to an element, designated A, which may be a draft rod extending from an automobile or truck, or may be a section of a pump rod or any like element, and of course the fork 14 embraces the section element B which may be the draft rod of a trailer or which may be a pump rod section or any other like element having an aperture through which the locking bolt 17 may be projected.

It will be seen that this coupling is very simple and may be cheaply made; that it may be easily manipulated, and that the slide 18 provides positive locking means which positively holds the bolt 17 from any chance of retraction from the fork and thus from disengagement with the element B.

Having thus described my invention, what is claimed, is:

1. A coupling of the character described, comprising a body having an apertured fork at one end, a lever pivoted upon the body and having a locking bolt adapted to pass through the apertures of the fork, a slide mounted upon the body for longitudinal movement toward or from the pivot pin of the lever, the slide when pushed toward the pin being disposed beneath the rear end of the lever and preventing the rear end from being depressed and the locking bolt from being raised from the fork, the slide being retractible to permit the depression of the rear end of the lever.

2. A coupling of the character described including a body having a fork at one end, the fork being apertured, a pin extending through the body, a lever pivoted upon the pin, a locking bolt pivoted to one end of the lever and operating through the apertures of the fork, a slide embracing the body and having limited sliding engagement therewith and formed with a protuberant portion adapted, when the slide is shifted toward the pivot pin, to engage beneath the rear end of the lever and prevent its depression, the slide being adjustable out of such position, and a spring urging the slide toward the pivot pin.

3. A coupling of the character described, including a body formed of a channel iron, a fork attached to the forward end of the body and projecting beyond the same, the arms of the fork being apertured, a pivot pin extending through the body, lock nuts engaging the pivot pin and body whereby the pivot pin may be adjusted, a lever pivoted upon said pivot pin, a locking bolt pivoted to the lever and movable through the apertures on the fork, a slide embracing the body, a bolt extending through the slide, the sides of the body being slotted for the passage of the bolt whereby the slide may be shifted forward or rearward, the slide having a protuberant portion adapted to engage beneath the rear end of the lever when the slide is shifted toward the pivot pin, the slide being retractible from this position, and a spring urging the slide toward the pivot pin.

HERMAN A. ONKEN.